United States Patent
McLean (10) Patent No.: US 9,278,506 B2
(45) Date of Patent: Mar. 8, 2016

(54) NON-METALLIC, TABBED MULTI-PURPOSE COVERING FOR HYGIENICALLY COVERING A CONTAINER TOP

(75) Inventor: Andrew Fenwick McLean, Reading (GB)

(73) Assignee: SELIG SEALING PRODUCTS, INC., Forrest, IL (US)

( * ) Notice: Subject to any disclaimer, the term of this patent is extended or adjusted under 35 U.S.C. 154(b) by 643 days.

(21) Appl. No.: 13/476,694

(22) Filed: May 21, 2012

(65) Prior Publication Data
US 2012/0228297 A1 Sep. 13, 2012

Related U.S. Application Data

(63) Continuation of application No. 12/674,294, filed as application No. PCT/US2008/010065 on Aug. 25, 2008, now Pat. No. 8,201,385.

(60) Provisional application No. 60/957,748, filed on Aug. 24, 2007.

(51) Int. Cl.
| | |
|---|---|
| *B65D 51/20* | (2006.01) |
| *B32B 27/08* | (2006.01) |
| *B65D 17/00* | (2006.01) |
| *B32B 27/32* | (2006.01) |
| *B32B 27/36* | (2006.01) |
| *B32B 3/02* | (2006.01) |

(52) U.S. Cl.
CPC . *B32B 27/08* (2013.01); *B32B 3/02* (2013.01); *B32B 27/32* (2013.01); *B32B 27/36* (2013.01); *B65D 17/16* (2013.01); *B65D 51/20* (2013.01); *B32B 2250/24* (2013.01); *B32B 2307/31* (2013.01); *B32B 2307/412* (2013.01); *B32B 2435/02* (2013.01); *B32B 2439/66* (2013.01); *B65D 2251/0031* (2013.01); *B65D 2251/0071* (2013.01); *B65D 2517/0098* (2013.01)

(58) Field of Classification Search
CPC ........ B32B 27/08; B32B 27/32; B32B 27/36; B32B 3/02; B32B 2250/24; B32B 2307/31; B32B 2307/412; B32B 2435/02; B32B 2439/66; B65D 17/16; B65D 51/20; B65D 2251/0031; B65D 2251/0071; B65D 2517/0098
USPC ............. 220/257.1, 257.2, 258.1, 258.2, 270, 220/359.1–369.3; 215/45, 349; 248/66.3–66.5, 200, 346–349
See application file for complete search history.

(56) References Cited

U.S. PATENT DOCUMENTS

| | | | | |
|---|---|---|---|---|
| 3,195,764 | A * | 7/1965 | Fried et al. | 220/270 |
| 3,317,068 | A * | 5/1967 | Betner | 215/233 |
| 3,671,356 | A * | 6/1972 | Keinanen | 56/69 |
| 4,013,188 | A | 3/1977 | Ray | |

(Continued)

FOREIGN PATENT DOCUMENTS

| | | |
|---|---|---|
| AT | 501 393 A1 | 8/2006 |
| AT | 11 738 U1 | 4/2011 |

(Continued)

*Primary Examiner* — Anthony Stashick
*Assistant Examiner* — James Way
(74) *Attorney, Agent, or Firm* — Fitch, Even, Tabin & Flannery LLP (57) ABSTRACT

A covering substrate adhered to a container providing a hygienic environment at a top portion of the container. The covering substrate includes a non-metallic covering with a tab defined within the perimeter of the substrate.

23 Claims, 4 Drawing Sheets

(56) References Cited

U.S. PATENT DOCUMENTS

| | | | | |
|---|---|---|---|---|
| 4,206,165 | A | 6/1980 | Dukess | |
| 4,266,687 | A | 5/1981 | Cummings | |
| 4,438,850 | A | 3/1984 | Kahn | |
| 4,514,248 | A | 4/1985 | Cummings | |
| 4,579,240 | A | 4/1986 | Ou-Yang | |
| 4,650,082 | A | 3/1987 | Paciorek | |
| 4,708,257 | A | 11/1987 | Deline | |
| 4,741,791 | A | 5/1988 | Howard et al. | |
| 4,754,890 | A * | 7/1988 | Ullman et al. | 215/232 |
| 4,767,016 | A | 8/1988 | Cook, Jr. et al. | |
| 4,772,650 | A | 9/1988 | Ou-Yang | |
| 4,773,718 | A * | 9/1988 | Weitzen et al. | 359/3 |
| 4,837,061 | A | 6/1989 | Smits et al. | |
| 4,856,857 | A | 8/1989 | Takeuchi et al. | |
| 4,892,209 | A | 1/1990 | Dorfman et al. | |
| 4,934,544 | A | 6/1990 | Han et al. | |
| 4,960,216 | A | 10/1990 | Giles et al. | |
| 4,961,986 | A | 10/1990 | Galda et al. | |
| 4,980,222 | A | 12/1990 | Rivera et al. | |
| 4,994,314 | A | 2/1991 | Rosenfeld et al. | |
| 5,004,111 | A | 4/1991 | McCarthy | |
| 5,015,318 | A | 5/1991 | Smits et al. | |
| 5,055,150 | A | 10/1991 | Rosenfeld et al. | |
| 5,057,365 | A | 10/1991 | Finkelstein et al. | |
| 5,071,710 | A | 12/1991 | Smits et al. | |
| 5,084,143 | A | 1/1992 | Smith | |
| 5,098,495 | A | 3/1992 | Smits et al. | |
| 5,108,003 | A * | 4/1992 | Granofsky | 220/257.2 |
| 5,125,529 | A * | 6/1992 | Torterotot | 220/270 |
| 5,128,779 | A | 7/1992 | Mallik | |
| 5,135,262 | A | 8/1992 | Smith et al. | |
| 5,149,386 | A | 9/1992 | Smits et al. | |
| 5,153,042 | A | 10/1992 | Indrelie | |
| 5,160,767 | A | 11/1992 | Genske et al. | |
| 5,169,707 | A | 12/1992 | Faykish et al. | |
| 5,178,967 | A | 1/1993 | Rosenfeld et al. | |
| 5,197,618 | A | 3/1993 | Goth | |
| 5,200,253 | A | 4/1993 | Yamaguchi et al. | |
| 5,217,790 | A * | 6/1993 | Galda et al. | 428/200 |
| 5,218,472 | A | 6/1993 | Jozefowicz et al. | |
| 5,226,281 | A | 7/1993 | Han et al. | |
| 5,261,990 | A * | 11/1993 | Galda et al. | 156/262 |
| 5,265,745 | A | 11/1993 | Pereyra et al. | |
| 5,319,475 | A | 6/1994 | Kay et al. | |
| 5,381,913 | A | 1/1995 | Peeters | |
| 5,381,914 | A | 1/1995 | Koyama et al. | |
| 5,433,992 | A * | 7/1995 | Galda et al. | 428/201 |
| 5,510,171 | A | 4/1996 | Faykish | |
| 5,514,442 | A | 5/1996 | Galda et al. | |
| 5,544,770 | A | 8/1996 | Travisano | |
| 5,560,989 | A | 10/1996 | Han | |
| 5,598,940 | A | 2/1997 | Finkelstein et al. | |
| 5,601,200 | A | 2/1997 | Finkelstein et al. | |
| 5,615,789 | A | 4/1997 | Finkelstein et al. | |
| 5,647,497 | A * | 7/1997 | Labbe | 220/257.2 |
| 5,656,360 | A | 8/1997 | Faykish et al. | |
| 5,669,521 | A | 9/1997 | Wiening et al. | |
| 5,702,015 | A | 12/1997 | Giles et al. | |
| 5,712,042 | A | 1/1998 | Cain | |
| 5,860,544 | A * | 1/1999 | Brucker | 215/232 |
| 5,887,747 | A * | 3/1999 | Burklin et al. | 220/359.2 |
| 5,893,477 | A | 4/1999 | Kaneko et al. | |
| 5,934,495 | A * | 8/1999 | Chiodo | 220/257.2 |
| 5,975,304 | A | 11/1999 | Cain et al. | |
| 5,996,832 | A * | 12/1999 | Nieuwoudt | 220/257.2 |
| 6,015,059 | A | 1/2000 | Takayama | |
| 6,082,566 | A | 7/2000 | Yousif et al. | |
| 6,113,720 | A * | 9/2000 | Fresnel | 156/85 |
| 6,120,882 | A | 9/2000 | Faykish et al. | |
| 6,131,754 | A | 10/2000 | Smelko | |
| 6,139,931 | A | 10/2000 | Finkelstein et al. | |
| 6,194,042 | B1 | 2/2001 | Finkelstein et al. | |
| 6,196,383 | B1 * | 3/2001 | Pinchen et al. | 206/264 |
| 6,210,766 | B1 * | 4/2001 | McLaughlin | 428/35.7 |
| 6,258,425 | B1 | 7/2001 | Parmentier et al. | |
| 6,277,478 | B1 | 8/2001 | Kurita et al. | |
| 6,284,337 | B1 | 9/2001 | Lorimor et al. | |
| 6,312,776 | B1 | 11/2001 | Finkelstein et al. | |
| 6,338,418 | B1 * | 1/2002 | Derose | 220/257.2 |
| 6,351,537 | B1 | 2/2002 | Dovgodko et al. | |
| 6,378,715 | B1 | 4/2002 | Finkelstein et al. | |
| 6,443,323 | B1 * | 9/2002 | DeRose | 220/257.1 |
| 6,458,302 | B1 | 10/2002 | Shifflet | |
| 6,461,714 | B1 * | 10/2002 | Giles | 428/126 |
| 6,494,491 | B1 | 12/2002 | Zeiter et al. | |
| 6,497,336 | B2 * | 12/2002 | Grayer | 220/359.2 |
| 6,531,230 | B1 | 3/2003 | Weber et al. | |
| 6,602,309 | B2 | 8/2003 | Vizulis et al. | |
| 6,659,507 | B2 | 12/2003 | Banahan | |
| 6,699,566 | B2 | 3/2004 | Zeiter et al. | |
| 6,705,467 | B1 | 3/2004 | Kancsar et al. | |
| 6,722,272 | B2 | 4/2004 | Jud | |
| 6,737,154 | B2 | 5/2004 | Jonza et al. | |
| 6,767,425 | B2 | 7/2004 | Meier | |
| 6,775,036 | B2 | 8/2004 | Cox et al. | |
| 6,866,926 | B1 | 3/2005 | Smelko et al. | |
| 6,902,075 | B2 | 6/2005 | O'Brien et al. | |
| 6,911,241 | B2 * | 6/2005 | Tyler et al. | 428/36.5 |
| 6,916,516 | B1 | 7/2005 | Gerber et al. | |
| 6,955,736 | B2 | 10/2005 | Rosenberger et al. | |
| 6,974,045 | B1 | 12/2005 | Trombach et al. | |
| 6,986,930 | B2 * | 1/2006 | Giles | 428/119 |
| 7,005,178 | B2 | 2/2006 | Bonkowski et al. | |
| 7,012,032 | B2 | 3/2006 | Cosentino et al. | |
| 7,029,745 | B2 | 4/2006 | Bonkowski et al. | |
| 7,064,897 | B2 | 6/2006 | Hebrink et al. | |
| 7,128,210 | B2 | 10/2006 | Razeti et al. | |
| 7,144,617 | B2 | 12/2006 | Schilling et al. | |
| 7,182,475 | B2 | 2/2007 | Kramer et al. | |
| 7,217,454 | B2 * | 5/2007 | Smelko et al. | 428/319.1 |
| 7,224,528 | B2 | 5/2007 | Phillips et al. | |
| RE39,790 | E | 8/2007 | Fuchs et al. | |
| 7,276,281 | B2 * | 10/2007 | Tyler | 428/319.3 |
| 7,316,760 | B2 | 1/2008 | Nageli | |
| 7,448,153 | B2 | 11/2008 | Maliner et al. | |
| 7,531,228 | B2 | 5/2009 | Perre et al. | |
| 7,703,625 | B2 * | 4/2010 | Westphal | 220/270 |
| 7,713,605 | B2 | 5/2010 | Yousif et al. | |
| 7,740,927 | B2 | 6/2010 | Yousif et al. | |
| 7,781,037 | B2 * | 8/2010 | Korson | 428/35.9 |
| 7,798,359 | B1 | 9/2010 | Marsella | |
| 7,819,266 | B2 | 10/2010 | Ross et al. | |
| 7,838,109 | B2 | 11/2010 | Declerck | |
| 7,997,496 | B2 * | 8/2011 | Scheir | 235/488 |
| 8,057,896 | B2 * | 11/2011 | Smelko et al. | 428/347 |
| 8,201,385 | B2 * | 6/2012 | McLean | 53/411 |
| 8,329,288 | B2 | 12/2012 | Allegaert et al. | |
| 2002/0068140 | A1 | 6/2002 | Finkelstein et al. | |
| 2003/0138593 | A1 * | 7/2003 | Cox et al. | 428/66.6 |
| 2003/0196418 | A1 | 10/2003 | O'Brien et al. | |
| 2004/0071934 | A1 * | 4/2004 | Giles | 428/126 |
| 2004/0109963 | A1 | 6/2004 | Zaggia et al. | |
| 2004/0187439 | A1 | 9/2004 | St. John | |
| 2004/0209028 | A1 | 10/2004 | Gosselin | |
| 2005/0048307 | A1 | 3/2005 | Schubert et al. | |
| 2005/0208242 | A1 | 9/2005 | Smelko et al. | |
| 2006/0000545 | A1 | 1/2006 | Nageli et al. | |
| 2006/0003120 | A1 | 1/2006 | Nageli et al. | |
| 2006/0003122 | A1 | 1/2006 | Nageli et al. | |
| 2006/0151415 | A1 | 7/2006 | Smelko et al. | |
| 2007/0058227 | A1 | 3/2007 | Raksha et al. | |
| 2007/0065609 | A1 * | 3/2007 | Korson | 428/34.1 |
| 2007/0183047 | A1 | 8/2007 | Phillips et al. | |
| 2007/0195392 | A1 | 8/2007 | Phillips et al. | |
| 2007/0206249 | A1 | 9/2007 | Phillips et al. | |
| 2007/0298273 | A1 | 12/2007 | Thies et al. | |
| 2008/0026171 | A1 | 1/2008 | Gullick et al. | |
| 2008/0103262 | A1 | 5/2008 | Haschke | |
| 2008/0110896 | A1 * | 5/2008 | Westphal | 220/359.2 |
| 2008/0121605 | A1 | 5/2008 | Thorstensen-Woll | |
| 2008/0156443 | A1 | 7/2008 | Schaefer et al. | |
| 2008/0169286 | A1 | 7/2008 | McLean et al. | |
| 2008/0231922 | A1 | 9/2008 | Thorstensen-Woll | |
| 2008/0233339 | A1 | 9/2008 | Thorstensen-Woll | |

(56) References Cited

U.S. PATENT DOCUMENTS

| | | |
|---|---|---|
| 2008/0233424 A1 | 9/2008 | Thorstensen-Woll et al. |
| 2008/0257850 A1 | 10/2008 | O'Keefe-Broadbent |
| 2009/0078671 A1 | 3/2009 | Triquet et al. |
| 2009/0208729 A1 | 8/2009 | Allegaert et al. |
| 2009/0304964 A1* | 12/2009 | Sachs et al. ............ 428/36.5 |
| 2010/0009162 A1 | 1/2010 | Rothweiler |
| 2010/0030180 A1 | 2/2010 | Declerck |
| 2010/0047552 A1 | 2/2010 | Mclean et al. |
| 2010/0059942 A1 | 3/2010 | Rothweiler |
| 2010/0116410 A1 | 5/2010 | Yousif |
| 2010/0155288 A1 | 6/2010 | Harper et al. |
| 2010/0170820 A1 | 7/2010 | Leplatois et al. |
| 2010/0193463 A1* | 8/2010 | O'Brien et al. ............ 215/232 |
| 2010/0213193 A1 | 8/2010 | Helmlinger et al. |
| 2010/0221483 A1 | 9/2010 | Gonzalez Carro et al. |
| 2010/0290663 A1 | 11/2010 | Trassl et al. |
| 2010/0314278 A1 | 12/2010 | Fonteyne et al. |
| 2011/0000917 A1 | 1/2011 | Wolters et al. |
| 2011/0005961 A1 | 1/2011 | Leplatois et al. |
| 2011/0089177 A1* | 4/2011 | Thorstensen-Woll ..... 220/359.4 |
| 2011/0091715 A1 | 4/2011 | Rakutt et al. |
| 2011/0138742 A1* | 6/2011 | McLean ................. 53/329.2 |
| 2012/0043330 A1* | 2/2012 | McLean et al. ............ 220/359.2 |
| 2012/0070636 A1 | 3/2012 | Thorstensen-Woll |
| 2012/0107577 A1* | 5/2012 | Sachs et al. ............. 428/195.1 |

FOREIGN PATENT DOCUMENTS

| | | |
|---|---|---|
| BR | 8200231 U | 9/2003 |
| BR | 0300992 A | 11/2004 |
| DE | 87 13 226 U1 | 11/1987 |
| DE | 91 08 868 U1 | 9/1991 |
| DE | 102 04 281 A1 | 8/2003 |
| DE | 10 2006 030 118 B3 | 5/2007 |
| DE | 10 2007 022 935 B4 | 4/2009 |
| DE | 20 2009 000 245 U1 | 4/2009 |
| EP | 0 668 221 A1 | 8/1995 |
| EP | 0 826 598 A2 | 3/1998 |
| EP | 0 826 599 A2 | 3/1998 |
| EP | 0 905 039 A1 | 3/1999 |
| EP | 0 717 710 B1 | 4/1999 |
| EP | 0 915 026 A1 | 5/1999 |
| EP | 0 706 473 B1 | 8/1999 |
| EP | 0 803 445 B1 | 11/2003 |
| EP | 1 834 893 A1 | 9/2007 |
| EP | 1 839 898 A1 | 10/2007 |
| EP | 1 839 899 A1 | 10/2007 |
| EP | 1 857 275 A1 | 11/2007 |
| EP | 1 873 078 A1 | 1/2008 |
| EP | 1 445 209 B1 | 5/2008 |
| EP | 1 918 094 A1 | 5/2008 |
| EP | 1 935 636 A1 | 6/2008 |
| EP | 1 968 020 A1 | 9/2008 |
| EP | 1 992 476 A1 | 11/2008 |
| EP | 2 014 461 A1 | 1/2009 |
| EP | 2 230 190 A1 | 9/2010 |
| EP | 2 292 524 A1 | 3/2011 |
| FR | 2 754 375 A1 | 4/1998 |
| FR | 2 916 157 A1 | 11/2008 |
| FR | 2 943 322 A1 | 9/2010 |
| GB | 2 273 492 A | 6/1994 |
| GB | 2 298 391 A | 9/1996 |
| JP | 01-240463 A | 9/1989 |
| JP | 2000-255621 A | 9/2000 |
| JP | 2004-315035 A | 11/2004 |
| KR | 10-0711073 B1 | 4/2007 |
| KR | 10-0840926 B1 | 6/2008 |
| KR | 10-0886955 B1 | 3/2009 |
| MX | PA05002905 A | 2/2006 |
| MX | 2010001867 A | 4/2010 |
| TW | 194965 | 11/1992 |
| WO | 89/02402 A1 | 3/1989 |
| WO | 93/08084 A1 | 4/1993 |
| WO | 93/13999 A1 | 7/1993 |
| WO | 97/02997 A1 | 1/1997 |
| WO | 99/21775 A1 | 5/1999 |
| WO | 00/66450 A1 | 11/2000 |
| WO | 2005/100186 A1 | 10/2005 |
| WO | 2006/018556 A1 | 2/2006 |
| WO | 2006/021291 A1 | 3/2006 |
| WO | 2006/099260 A1 | 9/2006 |
| WO | 2006/108853 A1 | 10/2006 |
| WO | 2007/109113 A2 | 9/2007 |
| WO | 2008/027029 A2 | 3/2008 |
| WO | 2008/027036 A1 | 3/2008 |
| WO | 2008/039350 A2 | 4/2008 |
| WO | 2008/118563 A1 | 10/2008 |
| WO | 2008/125784 A1 | 10/2008 |
| WO | 2008/125785 A1 | 10/2008 |
| WO | 2008/148176 A1 | 12/2008 |
| WO | 2009/092066 A2 | 7/2009 |
| WO | 2010/115811 A1 | 10/2010 |
| WO | 2011/039067 A1 | 4/2011 |

* cited by examiner

NON-METALLIC, TABBED MULTI-PURPOSE COVERING FOR HYGIENICALLY COVERING A CONTAINER TOP

CROSS REFERENCE TO RELATED APPLICATIONS

This application is a continuation of prior application Ser. No. 12/674,294, filed Apr. 22, 2010, now U.S. Pat. No. 8,201,385, which is a U.S. National phase application filed under 35 U.S.C. §371 of International Application PCT/US2008/010065, filed on Aug. 25, 2008, designating the United States, which claims priority to U.S. Provisional Patent Application No. 60/957,748, entitled, "Multi-Purpose Covering and Method Of Hygienically Covering a Container Top," filed Aug. 23, 2007, the entirety of which are all hereby incorporated herein by reference.

FIELD OF THE INVENTION

The present invention relates to container covering and sealing members and more particularly to a covering substrate that serves multiple purposes by creating a hygienic environment at a top portion of a container as well as providing a promotional or advertising surface in an inexpensive and easy to peel off cover. The invention also relates to a method for hygienically covering a top portion of a container.

BACKGROUND OF THE INVENTION

Various types of sealing, closure or covering members for containers are known and these members are seen to include a number of different material compositions and also function in several different ways. Generally however, the sealing and covering members are known to have a laminated structure and are heat sealed to a top of the container either by conduction or induction heating. The sealing and covering members also may either be included in a cap or alternatively bonded to the container without a cap.

Standard induction seals or coverings have included laminated structures made up of an upper half and a lower half which separate from each other when the container is opened. The seals generally include a compressing agent (pulp board or polyethylene foam) and an induction membrane layer (aluminum foil) with a wax layer between to keep in place during processing. The membrane layer further includes an adhesive layer on its bottom surface which is generally a heat activated adhesive layer. During bottling operations, the seal is placed between the rim of the filled container and the cap. When energy is applied, the induction membrane layer becomes heated, thereby melting the wax and activating the adhesive. The adhesive layer bonds the membrane to the rim and the compressing agent generally remains lodged in the inner portion of the cap. The wax is absorbed into the compressing agent.

Upon opening, the upper and lower halves of the sealing member separate with ease as the wax bond is no longer present leaving the upper half (typically board or paper) in the cap while the lower half remains sealed to the rim of the container. Such a seal is referred to as a two piece seal or liner; as after the cap is removed the liner has separated into two parts. Standard induction seals are also known to both include removal tabs secured to or integral with the lower half of the member and also exclude tabs altogether leaving the lower half as just a seal bonded to the rim of the container.

Standard induction seals are also known to include additional layers and alternative layers of materials in the laminated structure, such as synthetic foam rather than pulp board as well as multi-foam layers in both upper and lower halves of the laminated seal structures. Most typically, expensive raw materials such as 125 micron high density expanded polyethylene foam and 20 micron Aluminum are used in one or more layers of the standard induction seal structures.

Other known sealing and covering members are also laminated structures heat sealed to a rim of a container; however these structures do not make use of a cap as discussed above, and are referred to as one piece seals or liners. These capless one piece sealing and covering members are bonded to the rim of the container and extend beyond the top surface of the rim to envelop the entire rim of the container within the sealing or covering member. These sealing or covering members are also known to extend beyond the entire rim and adhere to or cover a portion of the container within the sealing or covering member. Additionally, a tab integral with and used to peel off the sealing or covering member also extends beyond the rim of the container as well as beyond the perimeter of the sealing or covering member. The tab protrudes from the perimeter of the sealing and covering member and hangs over a portion of the container when the sealing or covering member is affixed in place. These sealing or covering members are known to be affixed to a standard aluminum can and peel off in one piece by pulling the tab extending beyond the sealing or covering member.

Significantly, known sealing or covering members do not include a substrate which omits expensive raw materials, such as polyethylene foam and aluminum, and is contained substantially within the perimeter of a rim of a container being exclusively affixed to a top surface of the rim. Known sealing and covering members also do not include a substrate which peels off in one piece by pulling a tab contained substantially within the perimeter of the substrate and the periphery of the rim of the container.

SUMMARY OF THE INVENTION

The present invention addresses shortcomings of the prior art to provide a covering substrate which is inexpensive to manufacture and adhere to a container yet provides a hygienic environment at a top portion of the container as well as provides multiple promotional or advertising surfaces. In one embodiment, the covering substrate is bonded to the container substantially within the perimeter of the rim and includes a tab wholly contained within the perimeter of the substrate for quick and simple peeling off of the covering substrate in one piece. In alternative embodiments, the substrate and/or the tab extend to a limited degree beyond the rim.

In one embodiment of the invention, a covering substrate, capable of being Bonded to a rim of a container, the container including a top wall and the rim extending beyond the top wall defining a top portion of the container, and the covering providing a hygienic environment at the top portion of the container, includes a substrate, a heat seal coating laminated to the substrate and disposed for bonding the substrate to the container substantially along the perimeter of the rim, and a bondable material layered in part to the substrate opposite the heat seal coating. A portion of the bondable material defines a tab therein substantially contained within the perimeter of the substrate.

In another embodiment of the invention, the substrate is non-metalic, and in another embodiment the substrate includes a polyolefin film. In still another embodiment, the substrate includes a graphic on one or more sides, either the side bonded to the bondable material, the side laminated with the heat seal coating, or both.

In another embodiment of the invention, the bondable material is transparent, and in another embodiment, a graphic is laminated to the tab portion of the transparent bondable material.

In another embodiment of the invention, the bondable material includes a clear polyester material, and in another embodiment, the graphic includes a hologram on a polyester material.

In yet another embodiment of the invention, the container includes a metallic material and the substrate is capable of heat sealing to the container utilizing induction heating wherein the heat seal coating is susceptible to getting heat from the container. In still another embodiment, the substrate is further usable in a single stroke type punching and applying operation, and in another embodiment, the substrate is further usable on carrier application machines.

In a further embodiment of the invention, a covering substrate capable of being bonded to a rim of a container, the container having a top portion and the covering providing a hygienic environment at the top portion of the container, includes a substrate, a heat seal coating secured to the substrate, and a transparent material secured in part to the substrate opposite the heat seal coating, wherein the heat seal coating bonds the substrate to the container substantially within the perimeter of the rim. A graphic is further secured to the transparent material and a tab is defined in a portion of the transparent material, wherein the tab is wholly contained within the perimeter of the rim.

In an embodiment of the invention, a hygienically covered container includes a container having a top wall and a rim having a top surface and an inner surface extending from the top wall defining an uppermost perimeter of a top portion. A pour aperture is provided at the top portion and a covering substrate is bonded to the top surface of the rim substantially along the perimeter of the rim providing a hygienic environment at the top portion protecting the pour aperture and the inner rim surface from contamination creating a hygienic pour path from the pour aperture and the inner rim surface. In another embodiment of the invention, a tab portion is further defined by the covering substrate and substantially contained within the perimeter of the substrate, and in yet another embodiment, a graphic is further laminated to the tab portion of the covering substrate.

In another embodiment, a method of hygienically covering a top portion of a container, the container including a top wall and a rim extending beyond the top wall defining a top portion of the container, includes providing a substrate, laminating a heat seal coating to the substrate, layering a bondable material to a part of the substrate opposite the heat seal coating, sealing the substrate to a rim of a container substantially within the perimeter of the rim, and defining a tab in a portion of the bondable material wherein the tab is substantially contained within the perimeter of the substrate. In yet another embodiment, the method further includes a substrate which is non-metallic, and in another embodiment the container includes a metallic material and further includes applying induction heating to the container to seal the substrate to the container.

In another embodiment, the method includes heating the rim surface of the container before sealing the substrate to the rim, and in still another embodiment, the method includes applying conduction heating to melt the heat seal coating and seal the substrate to the rim of the container.

In yet another embodiment, the method further includes single stroke type punching and applying operation to position the substrate on the container, and in still another embodiment the method includes utilizing a carrier machine to position and seal the substrate to the container.

In still yet another embodiment, the method further includes laminating a graphic to the tab of the bondable material.

BRIEF DESCRIPTION OF THE DRAWINGS

For the purpose of facilitating an understanding of the inventions, the accompanying drawings and description illustrate a preferred embodiment thereof, from which the inventions, structure, construction and operation, and many related advantages may be readily understood and appreciated.

DESCRIPTION OF CERTAIN ILLUSTRATIVE EMBODIMENTS

The following description is provided to enable those skilled in the art to make and use the described embodiments set forth in the best modes contemplated for carrying out the invention. Various modifications, however, will remain readily apparent to those skilled in the art. Any and all such modifications, equivalents, and alternatives are intended to fall within the spirit and scope of the present invention.

Figure 1:
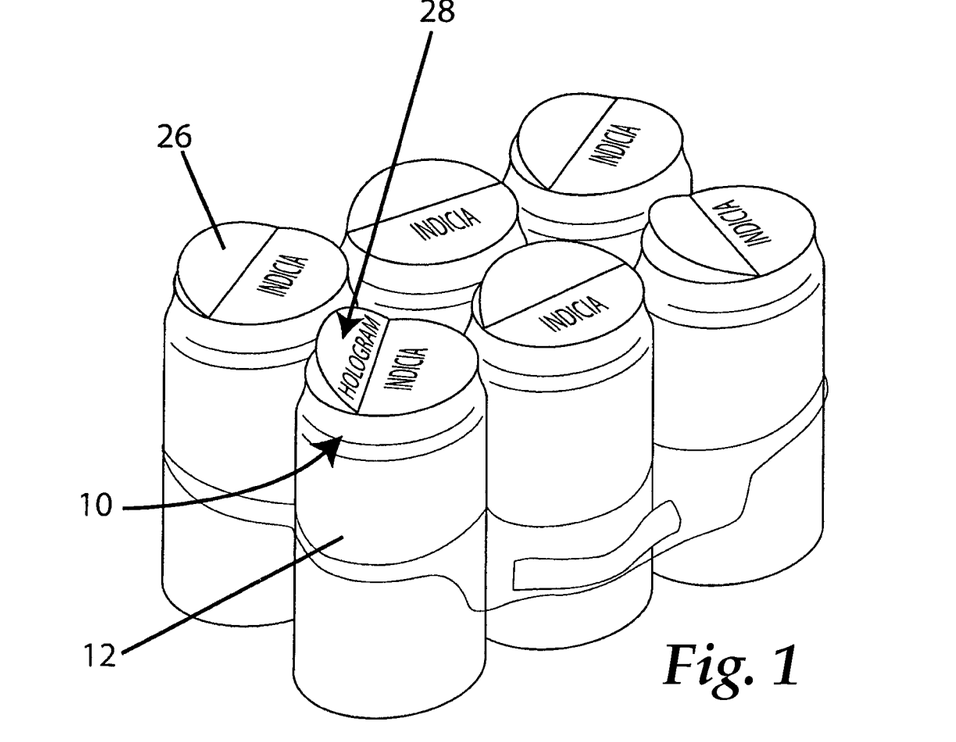
FIG. 1 is a perspective view of a covering substrate of an embodiment of the present invention illustrating the covering substrate bonded to a top portion of a container.
Figure 2:
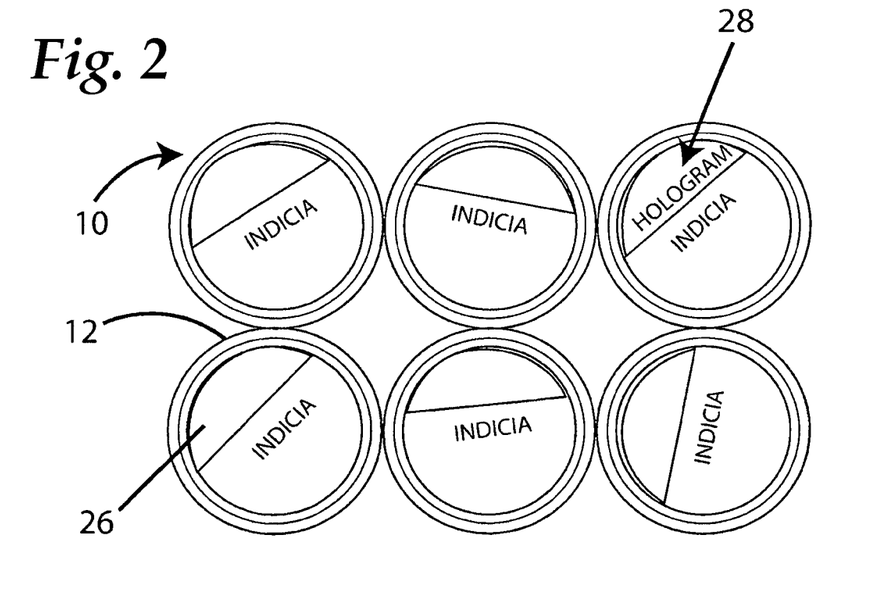
FIG. 2 is a top view of the covering substrate illustrating the substrate bonded to a top surface of a rim of the container.

A covering substrate 10, as seen in FIGS. 1 and 2, serves multiple purposes by creating a hygienic environment at a top portion of a container 12 as well as providing a promotional or advertising surface in an inexpensive and easy to peel off cover. The covering substrate 10, as seen in FIGS. 1 and 2, is generally flat, disc shaped and sized to fit substantially within a rim 14 of the container 12. The covering substrate 10 can incorporate any number of shapes and sizes, for example square or oval, large or small, depending upon the shape and size of the rim of the container upon which it is affixed. In the present described embodiment, as seen in FIGS. 1 and 2 illustrating six covering substrates 10 bonded to six separate beverage containers 12, the disc shaped covering substrate 10 is sized to fit substantially within the rim of a standard beverage can.

Figure 3:
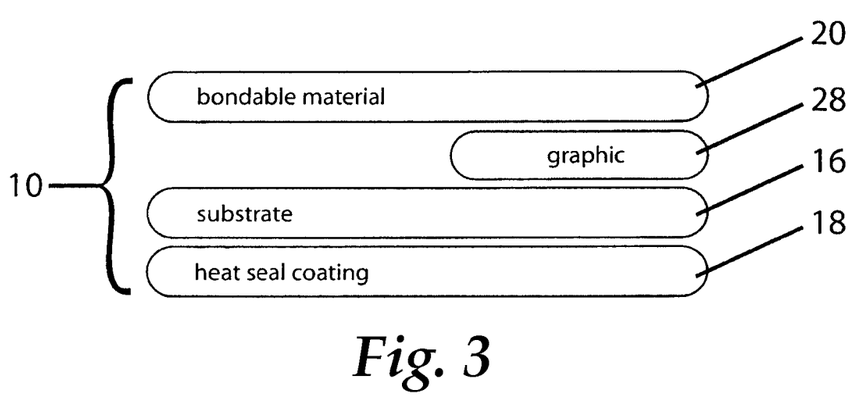
FIG. 3 illustrates the layers of material which make up the covering substrate of an embodiment of the invention.

The covering substrate 10, as seen in FIG. 3, is a laminate structure including a substrate 16, a heat seal coating 18 laminated to the substrate, and a bondable material 20 layered in part to the substrate opposite the heat seal coating. The substrate 16 can include a variety of printable materials of sufficient thickness and strength so as remain intact and not tear apart during the bottling, handling, distribution and storing of the container 12, as well as hold together as a single piece when the covering substrate 10 is peeled off the container 12, and have sufficient heat resistance so as not to degrade during heat sealing, whether conduction or induction heating or the like.

In the present described embodiment, the substrate 16 includes a polyolefin film of about 128 micron (5 mil). polyolefin film is printable, to the same extent as other unsupported polyethylene films, with an LLDPE rich version having higher internal and external bond levels, and an HDPE version having slightly better heat resistance.

Figure 4A:
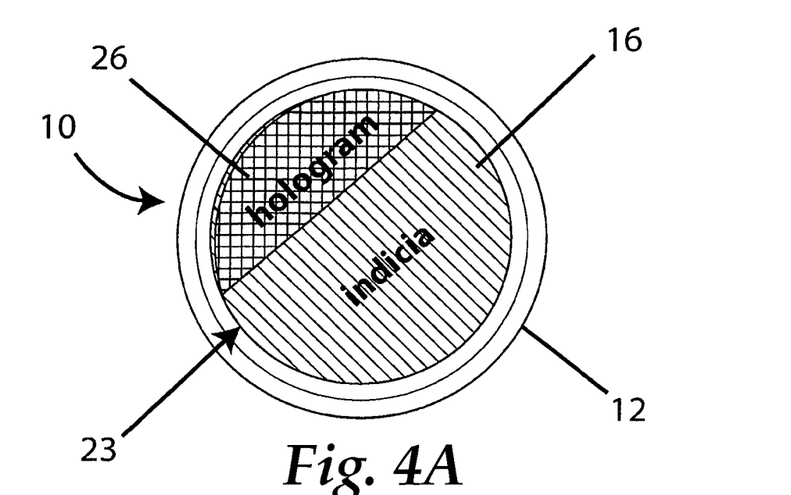
FIG. 4A illustrates the covering substrate bonded to a top portion of the container and FIG. 4B illustrates the container without the covering substrate.
Figure 4B:
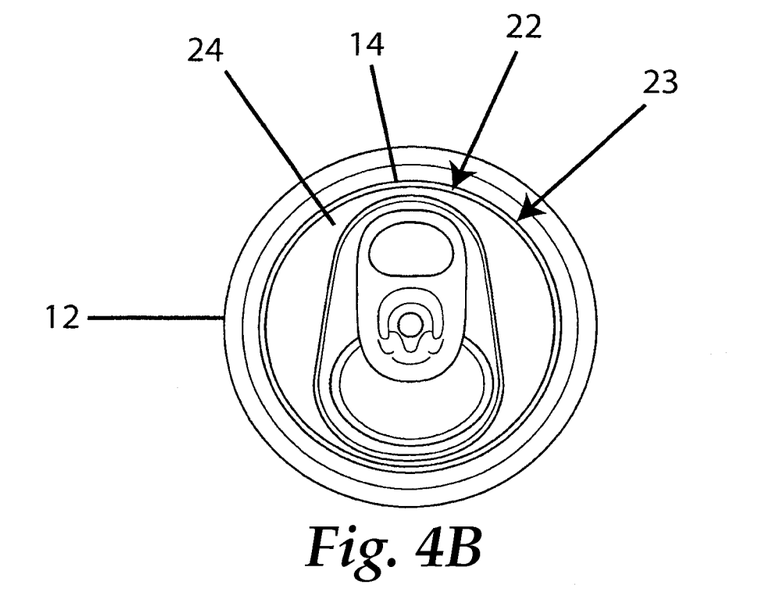
Figure 5A:
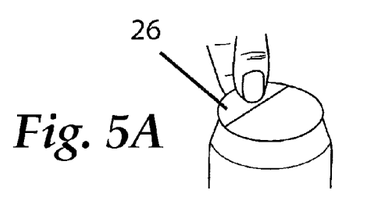
FIGS. 5A-5D illustrate the removal of the covering substrate from the container.
Figure 5B:
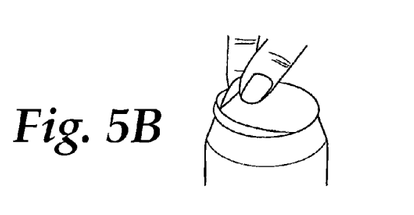
Figure 5C:
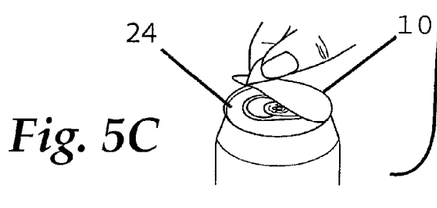
Figure 5D:
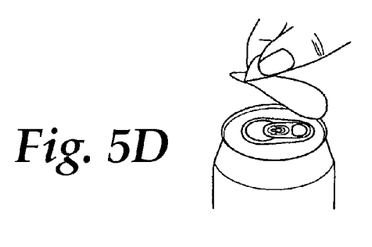

The covering substrate is capable of being bonded to the rim 14 of the container 12, wherein the container includes a top wall 24 and the rim 14 extends beyond the top wall 24 and defines a top portion of the container 12. More specifically, the substrate 16 is bonded to a top surface 22 of the rim 14 of the container 12 substantially within the perimeter of the rim 14 leaving side surfaces 23 of the rim exposed, as seen in FIG. 4A illustrating a covering substrate 10 bonded to a top portion of the container 12 as compared to FIG. 4B illustrating a container 12 without a covering substrate 10. As is seen in FIG. 4A, the substrate 16 is exclusively affixed to the top surface 22 of the rim 14 and does not hang over the rim 14 or extend onto the container 12 in any way. By remaining within the perimeter of the rim 14, the substrate 16 remains intact without tearing or wearing away during the bottling, handling, distribution and storing of the container 12, to a much better extent than if the substrate extended around the rim and onto the container exposing more sides and surfaces of the substrate 16 to bumping and tearing forces during the processes discussed above. In alternative embodiments, the substrate may extend beyond the rim to a limited degree.

Additionally, the substrate 16 has enough strength and rigidity or stiffness when bonded to the container 12 to maintain its flat, disc shape without collapsing or caving in when another container or several other containers are stacked on top of one another. Removal of a desired container from a stacked display where containers traditionally nest in each others neck profile, is substantially easier without accidentally pulling off undesired containers, when the containers include the covering substrate 10.

A heat seal coating 18, as seen in FIG. 3, is laminated to the substrate 16 and disposed for bonding the substrate to the container substantial y along the perimeter of the rim 14. The heat seal coating can include a variety of coatings at a strength and thickness sufficient to enable the covering substrate 10 to securely bond to the container 12 and also cleanly peel away from the container and remain on the substrate 16 without leaving any residue on the container 12 when removal of the covering substrate 10 is desired. In the present described embodiment, as seen in FIGS. 2 and 4, an extruded heat seal layer 18 about 37 micron thickness is coated on a surface of the substrate 16 to sufficiently bond the covering substrate 10 to the container 12 and also allow for its clean and easy removal, as described above.

A bondable material 20, as seen in FIG. 3, is secured in part to the substrate 16 opposite the heat seal coating 18, and a tab 26 is defined in a portion of the bondable material 20 therein. The bondable material 20 can include a variety of strong flexible materials sufficient to allow a force to be applied to easily and cleanly remove the covering substrate IO from the container 12. In the present described embodiment, the bondable material 20 is transparent and includes a clear polyester material about 23 micron thick.

The tab 26, as seen in FIG. 4A, is substantially contained within the perimeter of the substrate 16, and similar to substrate 16, the tab 26 does not extend beyond the periphery of the rim 14, nor does it hang down onto the container 12 in any way. Also similar to substrate 16, as described above, by maintaining the tab 26 within the perimeter of the rim 14, the tab 26 will remain intact without tearing or pealing away during the bottling, handling, distribution and storing of the container 12, to a much better extent than if the tab 26 extended around the rim and onto the container exposing more of the tab to bumping and tearing forces during the processes discussed above.

A graphic 28, as seen in FIG. 3, is laminated to the bondable material 20, and in the present described embodiment, the graphic 28 includes a hologram on a polyester material. The graphic 28, as seen in FIGS. 1 and 2, gives a premium look to the covering substrate 10 and clearly identifies to the user the location of the tab 26. Additionally, the clearly identified hologram re-enforces a brand image and prevents copying of the image increasing brand security.

In use, as seen in FIGS. 1 and 2, in the present described embodiment the covering substrate 10 provides a hygienic environment at the top portion of the beverage can, keeping the top free from dust and contamination that can accumulate during distribution and storage on retailers shelves or inside vending equipment guaranteeing the quality of the contents. Additionally, the covering substrate 10 provides at least three surfaces for providing promotional and advertising indicia, including graphics and brand development advertising on the top of a beverage can providing valuable low cost promotional space not before available.

As seen in FIGS. 1 and 2, indicia and graphics printed on the substrate 16 can be included on the side bonded to the transparent material 20 as well as the side coated with the heat seal 18 providing at least two surfaces for printing an image, logo, or graphic, etc. for use in advertising or promotional schemes. An image or indicia printed on the substrate 16 can clearly be seen through the transparent material 20 bonded to the substrate, and an image or indicia printed on the heat seal coating side can also clearly be seen when the covering substrate is peeled off from the container.

Advertising and promotions printed on both sides of the covering substrate 10 can work together in an overall marketing scheme to promote current and future sales. For example, images or indicia, such as brand logos etc., advertising a product can be seen from the outside of the container 12, while indicia discounting future purchases, contests, or public service messages, etc., can be promoted by printing brand collectibles, discounts, and/or other messages on the side of the substrate 16 revealed only when the covering substrate 10 is peeled off the container 12 after purchase.

In manufacturing, the covering substrate 10 can be constructed, positioned, and sealed to the container 12 by utilizing various manufacturing operations such as single stroke type punching and applying operations, or by utilizing carrier application machines, such as Hi-cone carrier machines, in addition to or in conjunction with heat seal methods such as conduction and induction heating.

The substrate 16 is capable of heat sealing to the container 12 utilizing induction heating, and in the present described embodiment, the substrate 16 can be non-metallic eliminating the expensive construction of standard induction liners which typically utilize 20 micron aluminum foil to generate the heat in the induction heating process to ensure the heat-seal face adheres to the container. Additionally, in standard induction liners, high density expanded polyethylene foam is also needed to deflect the heat in the direction of the heat-seal face ensuring a wide operating window and a consistent seal every time, further increasing the cost of a standard liner over the covering substrate, 10 of the present invention.

In the present described embodiment, the container 12 includes a metallic material, such as aluminum which is standard in the average beverage can, to generate the heat in the induction heating process. The aluminum in the container 12 is already in direct contact with the heat seal coating 18 during the sealing operation and melts the coating 18 to bond the substrate 16 to the container 12. Additionally, there is no requirement in the construction of the covering substrate 10 for expensive high density expanded polyethylene foam to direct the heat in the right direction, thereby further reducing component costs while improving functionality and meeting the requirements of the end user.

In a present described embodiment, as seen in FIG. 5, removal of the covering substrate 10 simply requires the user to grip the easy to locate tab 26, clearly identified with the hologram, pulling the tab 26 toward the center of the container 12 and peeling off the covering substrate 10 in one piece. As discussed above, the flat disc shaped covering substrate 10, which maintains its shape when removed from the container, is ideal for use in providing merchandising collectibles, such as promotional tokens, etc.

Additionally, the present described embodiment provides for a hygienically covered container including a container having a top wall and a rim having a top surface and an inner surface extending from the top wall defining an uppermost perimeter of a top portion. A pour aperture is provided at the top portion and a covering substrate is bonded to the top surface of the rim substantially along the perimeter of the rim providing a hygienic environment at the top portion protecting the pour aperture and the inner rim surface from contamination creating a hygienic pour path from the pour aperture and the inner rim surface. A tab portion is further defined by the covering substrate and substantially contained within the perimeter of the substrate. Additionally, a graphic is further laminated to the tab portion of the covering substrate.

A method of hygienically covering a top portion of a container, the container including a top wall and a rim extending beyond the top wall defining a top portion of the container, includes providing a substrate, laminating a heat seal coating to the substrate, layering a bondable material to a part of the substrate opposite the heat seal coating, and sealing the substrate to a rim of the container substantially along the perimeter of the rim. A tab is further defined in a portion of the bondable material wherein the tab is substantially contained within the perimeter of the substrate.

In the present described embodiment, the bondable material is transparent and the method further includes laminating a graphic to the tab of the transparent bondable material. Additionally, the substrate 16 is non-metalic, the container 12 includes a metallic material and further applying induction heating to the container 12 seals the substrate 16 to the container. Alternatively, without including a metallic material in either the substrate or the container, the process of heating the top rim surface 22 of the container 12 then applying the substrate 16 to the rim 24, or applying conduction heating to melt the heat seal coating, also bonds the substrate 16 to the container.

Additionally, in the present described embodiment, positioning and heat sealing the substrate 16 to the container 12 during the manufacturing process can be accomplished in a variety of way and specifically, in the present described embodiment, single stroke type punching and applying operations as well as a carrier machine, such as a Hi-Cone machine, can be employed to successfully position and seal the covering substrate 10 to the container 12.

What is claimed is:

1. A hygienically covered container, comprising:
   a container having a top wall and a rim having a top surface and an inner surface extending from the top wall defining an uppermost perimeter of a top portion;
   a pour aperture at the top portion;
   a non-metallic covering heat seal bonded to the top surface of the rim providing a hygienic environment at the top portion protecting the pour aperture and the inner rim surface from contamination;
   wherein the non-metallic covering has a perimeter and includes
   a non-metallic substrate;
   a separate heat seal coating applied to the non-metallic substrate and disposed for heat seal bonding the non-metallic covering to the container rim and configured to cleanly peel away from the container rim without leaving residue thereon;
   a bondable material including a portion secured in part to an upper surface of the non-metallic substrate and opposite the separate heat seal coating to define a tab substantially contained within the perimeter of the non-metallic covering; and
   wherein the non-metallic substrate extends between the separate heat seal coating and the bondable material.

2. The container according to claim 1, further comprising a graphic laminated to the tab of the non-metallic covering.

3. The container according to claim 1, wherein the non-metallic covering is arranged within the perimeter of the rim so that an outer surface of the rim is exposed.

4. The container according to claim 3, wherein the rim is non-threaded.

5. The container according to claim 1, wherein the container includes a metallic material.

6. The container according to claim 1, wherein the non-metallic covering includes a hologram.

7. The container according to claim 1, wherein the bondable material is transparent.

8. The container according to claim 7, further comprising a graphic laminated to the tab of the transparent bondable material.

9. The container according to claim 1, wherein the non-metallic substrate includes a graphic on one or more of a side adjacent the bondable material or a side adjacent the heat seal coating.

10. The container according to claim 1, wherein the bondable material includes a clear polyester material.

11. The container according to claim 8, wherein the graphic comprises a hologram on a polyester material.

12. The container according to claim 1, wherein the container comprises a metallic material and the non-metallic covering is capable of heat sealing to the container utilizing induction heating wherein the heat seal coating is susceptible to getting heat from the container.

13. A hygienically covered container, comprising:
   a container having a top wall including a rim having a top surface and inner and outer top wall side surfaces extending downwardly from the rim top surface defining an uppermost perimeter of a top portion;
   a pour aperture at the top portion;
   a non-metallic covering heat seal bonded to the top surface of the rim providing a hygienic environment at the top portion protecting the pour aperture and the inner rim surface;
   wherein the non-metallic covering has a side edge and includes
   a non-metallic substrate;
   a separate heat seal coating applied to the non-metallic substrate and disposed for heat seal bonding the non-metallic covering to the container rim; and
   a bondable material secured in part to the non-metallic substrate opposite the separate heat seal coating defining a tab substantially contained within the side edge of the non-metallic covering; and
   a separate layer of polyester laminated to the bondable material on an underside thereof and associated with the tab, the separate layer of polyester extending partway across the non-metallic covering so that one portion of the non-metallic covering is free of the separate layer of polyester and another portion of the non-metallic covering has the separate layer of polyester associated with the tab.

14. The hygienically covered container of claim 13, wherein an outer edge of the separate layer of polyester meets an outer edge of the bondable material on one side of the non-metallic covering.

15. The hygienically covered container of claim 13, wherein the non-metallic substrate extends between the separate heat seal coating and the bondable material.

16. The hygienically covered container of claim 15, wherein the bondable material is a layer of polyester.

17. The hygienically covered container of claim 15, wherein the heat seal coating of the non-metallic covering is configured to cleanly peel away from the container rim without leaving residue thereon.

18. The hygienically covered container of claim 13, wherein the non-metallic covering is free of foam.

19. The hygienically covered container of claim 13, wherein a thickness of the bondable material defining the tab is less than a thickness of the separate heat seal coating.

20. The hygienically covered container of claim 13, wherein the non-metallic covering is positioned on the container rim so that the side edge of the non-metallic covering is exposed and the non-metallic covering does not hang downwardly on the container top wall such that the outer side surface of the top wall is exposed.

21. The hygienically covered container of claim 1, wherein the bondable material is a layer of polyester.

22. The hygienically covered container of claim 1, wherein a thickness of the bondable material defining the tab is less than a thickness of the separate heat seal coating.

23. The hygienically covered container of claim 1, wherein the non-metallic covering is free of foam.

* * * * *